United States Patent [19]

Nakamoto et al.

[11] 4,417,446
[45] Nov. 29, 1983

[54] COMBINATION POWER PLANT

[75] Inventors: Yasunobu Nakamoto; Toshiro Terayama, both of Yokohama, Japan

[73] Assignee: Tokyo Shibaura Denki Kabushiki Kaisha, Kawasaki, Japan

[21] Appl. No.: 359,089

[22] Filed: Mar. 17, 1982

[30] Foreign Application Priority Data

Mar. 20, 1981 [JP] Japan .................................. 56-41239

[51] Int. Cl.³ ............................................. F03G 7/04
[52] U.S. Cl. ...................................... 60/641.7; 60/655
[58] Field of Search ..................... 60/641.6, 641.7, 655

[56] References Cited

FOREIGN PATENT DOCUMENTS 52-17145 2/1977 Japan ...................... 60/655

Primary Examiner—Allen M. Ostrager
Assistant Examiner—Peggy A. Loiacano
Attorney, Agent, or Firm—Finnegan, Henderson, Farabow, Garrett & Dunner

[57] ABSTRACT

A combination power plant including an ocean thermal energy conversion power plant and a steam generation power plant. Water discharged from a condenser in the ocean thermal energy conversion power plant is mixed with water discharged from an evaporator in the ocean thermal energy conversion power plant. The mixed water is used as cooling water for a condenser in the steam generation power plant. Part of the water discharged from the condenser in the steam generation power plant is used as heating water for the evaporator in the ocean thermal energy conversion power plant.

4 Claims, 4 Drawing Figures

COMBINATION POWER PLANT

BACKGROUND OF THE INVENTION

This invention relates to combination power plants in which a steam power generation plant and an ocean thermal energy conversion power plant are combined, and more particularly to a combination power plant which avoids or minimizes environmental problems associated with warm water which is discharged from the condenser in the steam power generation plant.

Generally, thermal power stations or nuclear power stations (which are referred to hereinafter as "steam power generation plants"), use steam produced in a boiler or in a nuclear reactor. This steam is used to rotate a turbine-generator and is then condensed in a condenser. A large quantity of water is required to condense the steam, so steam power generation plants usually are built along a river, lake or sea. One of the problems which arises is that warm water which is discharged from the condenser back into the river, lake or sea can cause environmental disruption. Therefore, it is important to lower the temperature of the water discharged from the condenser to minimize the environmental disruption effect on the body of water into which it is discharged. It is also important to minimize the quantity of water which is required for heat exchange in the condenser.

It is difficult to maintain a satisfactory level of thermal efficiency of a steam power generation plant when both the quantity of water used for heat exchange and the discharged water temperature is lowered. Also, it is difficult to lower the temperature of the water discharged from the condenser, because it is necessary to use a large quantity of cooling water in order to lower the temperature of the discharged water.

Another problem is that the temperature of the seawater (or river or lake) which is used as the cooling water for the steam power generation plant varies in different seasons. In summer the temperature of the seawater rises causing a corresponding pressure rise in the condenser. Accordingly, a greater quantity of steam is required for the turbine to maintain the rated output of the generator which is driven by the turbine. The steam turbine and the condenser generally are designed to provide the rated output at the maximum seawater temperature.

It will be appreciated that the seawater temperature is lower in the winter as well as in the spring and autumn, than it is in summer. Accordingly, the steam turbine and the condenser have excess capacity which is not utilized in the cooler seasons and which adds to the construction cost and equipment investment and lowers the plant efficiency. Designing other than to the maximum seawater temperature will result in less than the rated output of the power station at high seawater temperatures.

Ocean thermal energy conversion power plants using working fluids such as ammonia or Freon are similar principle to the aforementioned case. Ocean thermal energy conversion power plants use the temperature difference between the relatively warm seawater from the ocean surface and the cool seawater from the bottom of the ocean (or at a substantial depth). The working fluid such as Freon or ammonia is evaporated in an evaporator by surface seawater at about 30° C. introduced into the evaporator. The vaporized Freon rotates a binary turbine connected to a generator. The working fluid vapor exhausted from the binary turbine is introduced into a condenser where it is condensed by seawater from the ocean floor at about 7° C. The condensed working fluid is supplied to the evaporator by a working fluid pump and is evaporated again and then supplied to the binary turbine.

The temperature of seawater at a depth of about 500 to 600 meters is constant throughout the year whereas the seawater temperature at the surface varies considerably and is lower in winter. If the temperature difference between the warm surface seawater and the cool water at the ocean floor is not sufficient, e.g., 20° C., plant efficiency is reduced. This can occur particularly in winter.

SUMMARY OF THE INVENTION

It is a main object of this invention to provide a combined steam power generation plant and ocean thermal energy conversion power plant wherein the quantity of cooling water required for the heat exchange condenser of the steam power generation plant is minimized.

It is another object of this invention to provide a combination power plant of the above character in which the temperature of water discharged from the condenser of the steam power generation plant can be at a temperature for minimum environmental disruption.

It is yet another object of this invention to minimize the excess capacity of steam power generation plant thereby lowering required costs for plant components such as condenser, boiler, steam turbine, pump, and auxiliary equipment, and to improve the plant efficiency.

It is a further object of this invention to improve the working ratio and increase the versatility of the ocean thermal energy conversion power plant by using the warm water discharged from the steam power generation plant as heating water for the thermal energy power plant rendering the thermal energy power plant independent of the temperature of seawater from the ocean surface.

The combination power plant of the invention comprises an ocean thermal energy conversion power plant including a condenser and an evaporator; a steam power generation plant including a condenser; a cooling water pipe for passing cooling water through the condenser in the ocean thermal energy conversion power plant, means for mixing circulating water passing through the evaporator in the ocean thermal energy conversion power plant and the cooling water, and a circulating water pipe for circulating water from the mixing means through the condenser in the steam power generation plant and the evaporator in the ocean thermal energy conversion power plant.

DESCRIPTION OF THE PREFERRED EMBODIMENTS

Figure 1:
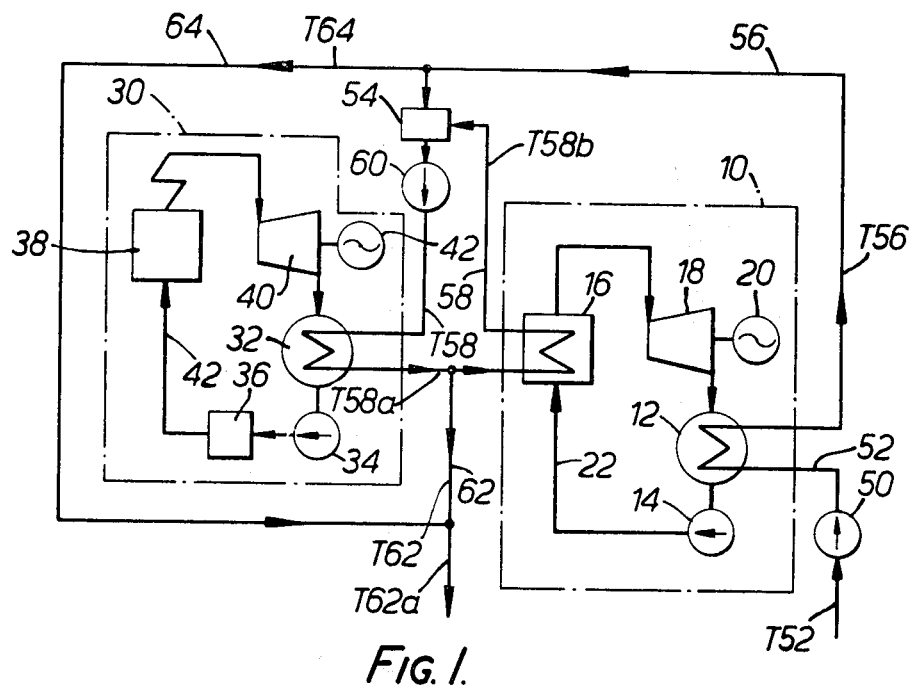
FIG. 1 is a schematic diagram of a combination power plant according to this invention.

Referring to FIG. 1, an ocean thermal energy conversion power plant is generally indicated at 10 and includes a condenser 12, a working fluid pump 14, an evaporator 16 and a binary turbine 18 to which a generator 20 is connected and driven thereby. These components are connected to each other in suitable fashion to form a working fluid circulation system 22. Working fluid such as ammonia or Freon is condensed in condenser 12 and is supplied to evaporator 16 by working fluid pump 14. Vaporized working fluid from evaporator 16 rotates binary turbine 18 which, in turn, rotates generator 20 to generate electricity.

In accordance with the invention and as embodied herein, there is provided a steam power generation plant 30 such as a thermal power station or a nuclear power station near the ocean thermal energy conversion power plant 10. Steam power generation plant 30 includes a condenser 32, a condensate pump 34, a feed water heater 36, a boiler (or a nuclear reactor) 38, and a steam turbine 40 to which a generator 42 is connected and driven thereby. These elements are connected to each other in suitable fashion to form a well-known water and/or steam circulation system 42.

As further embodied herein, a suction pump 50 is connected to condenser 12 in the ocean thermal energy conversion power plant 10 through a supply pipe 52 to draw cooling water from a sea, river, lake, marsh, etc. Cooling water T52 is supplied to the condenser by the suction pump 50. Cold water T56 which is discharged from condenser 12 is delivered to a mixing tank 54 through a cold water pipe 56.

Circulating water T58 passing through condenser 32 and evaporator 16 is supplied to the mixing tank 54 through a circulating water pipe 58. Circulating water T58 from the mixing tank 54 is supplied to condenser 32 by a circulating water pump 60.

An excess water discharge pipe 62 is connected to the circulating water pipe 58 between the condenser 32 and the evaporator 16. Moreover, a bypass pipe 64 is provided between the cold water pipe 56 and an excess water discharge pipe 62. Bypass pipe 64 is used for discharging excess water T64 from cold water pipe 56 through excess water discharge pipe 62.

In accordance with the invention and as embodied herein, the combination power plant according to this invention includes an ocean thermal energy conversion power plant 10 and a steam power generation plant 30 which are connected to each other by mixing tank 54, cold water pipe 56 and circulating water pipe 58.

The cooling water T52 is drawn from the ocean flow, for example, at a depth of about 500 to 600 meters, and is delivered to condenser 12 by pump 50. The vaporized working fluid, such as ammonia or Freon, is condensed in condenser 12 by the cooling water T52. The water T56 which is discharged from the condenser 12 is delivered to the mixing tank 54 through cold water pipe 56. The temperature of the water T56 is slightly higher than the temperature of the cooling water T52. Excess cold water T64 from the cold water pipe 56 can be discharged from excess water discharge pipe 62 through bypass pipe 64.

Circulating water T58 which is discharged from evaporator 16 is mixed with the cold water T56 in mixing tank 54 and the mixture is used to set the proper temperature for the circulating water T58. The circulating water T58 from mixing tank 54 is delivered to the condenser 32 by the circulating water pump 60. Exhausted steam from steam turbine 40 is condensed in condenser 32. Warm water T58a discharged from condenser 32 is delivered to evaporator 16. The discharged warm water T58a evaporates the working fluid liquid in evaporator 26 and the resulting vapor is delivered to binary turbine 18 causing it to rotate. Generator 20 which is connected to the binary turbine 18 is driven thereby to generate electricity. The circulating water T58b discharged from evaporator 16 returns to the mixing tank 54.

The water is condenser 32 is delivered to feed water heater 36 and boiler 38 by condensate pump 34. The condensed water delivered to boiler 38 is heated to produce steam which is delivered to steam turbine 40 to rotate it. Generator 42 which is driven by steam turbine 40 is rotated to generate electricity.

The quantity of cold water T56 flowing into mixing tank 54 can be adjusted by varying the amount of water flowing into bypass pipe 64 from pipe 56. This can be achieved by providing suitable control means such as a valve (not shown) at or near the junction of pipes 56, 64. By varying the quantity of cold water T56 flowing into tank 54, the temperature of the circulating water T58 is also adjusted. The excess cold water T64 is discharged from excess water discharge pipe 62.

With respect to a thermal power station operated alone, the quantity of cooling water required for the condenser varies in accordance with the season since seawater is used for the cooling water. The average temperature of seawater is about 22° C. and this temperature is taken as the design water temperature for the condenser. The desired temperature of the warm water which is discharged from the condenser is determined as is the quantity of the cooling water which must be supplied to the condenser. Since the temperature of the discharged water varies inversely with the quantity of cooling water, the required quantity of cooling water increases as the desired discharge temperature is lowered.

The temperature difference (i.e., the temperature rise) between the warm water (T58b) discharged from the condenser and the circulating water (T58) delivered to the condenser is generally required to be about 7° C. This temperature difference is difficult to achieve in a thermal power station operated alone. In a 375,000 kW thermal power station operated alone with cooling seawater at 22° C. and a required discharge temperature of about 29° C., approximately 60,000 t/h (tons per hour) of cooling water must be delivered to the condenser.

In summer, the temperature of the seawater rises causing a corresponding rise of pressure in a condenser. In a steam power generation plant such as illustrated at 30, this means an increase of pressure in condenser 32 and a corresponding decrease in the output of turbine 40.

It will be appreciated that electricity requirements of air conditioning can result in a shortage of electricity in summer. Accordingly, the power plant components such as condenser 32, boiler 38, steam turbine 40 and the auxiliary equipment are usually designed so that they can produce the necessary output in summer. This requires design of these components to an excess capacity of about 6 to about 10% for a water temperature of about 22° C. in order for the plant to meet the power output needs at higher summer water temperatures.

An overdesigned power plant of this type provides the required power output at the higher summer water temperatures. However, in other seasons the power station is only partially loaded with margin capacity and the utilization effectiveness or efficiency of the power station is low. It will be appreciated that if the temperature of condenser 32 can be made constant throughout the year, the above problem will be alleviated.

TABLE

| | T52 | | T56 | | T58 | | T58a | | T58b | | T64 | | T62 | | T62a | |
| --- | --- | --- | --- | --- | --- | --- | --- | --- | --- | --- | --- | --- | --- | --- | --- | --- |
| | t | W | t | W | t | W | t | W | t | W | t | W | t | W | t | W |
| THERMAL POWER STATION OPERATED ALONE | — | — | — | — | 22 | 60 | 29 | 60 | — | — | — | — | 29 | 60 | 29 | 60 |
| CASE I | 6.5 | 18.5 | 8.5 | 18.5 | 17.9 | 37.7 | 29 | 37.7 | 27 | 19.2 | — | 0 | 29 | 18.5 | 29 | 18.5 |
| CASE II | 6.5 | 27 | 8.5 | 27 | 19.8 | 45.8 | 29 | 45.8 | 27 | 28 | 8.5 | 9.2 | 29 | 17.8 | 22 | 27 | t: temperature of water, °C.
W: quantity of water in 1,000 t/h (tons/hour)

Case I in the TABLE shows how the aforementioned problems can be avoided with the present invention. In this example, there is no excess cold water T64 discharged through bypass pipe 64, i.e., all of the cold water T56 is delivered to mixing tank 54. With cooling water T52 drawn in by suction pump 50 at a temperature of about 6.5° C. from the bottom of the ocean (or a depth of about 500 to about 600 meters), there is a temperature rise of about 2° C. in this water as it emerges from the condenser 12. The temperature of the cold water T56 in cold water pipe 56 then is about 8.5° C. The cold water T56 is mixed in the mixing tank 54 with the circulating water T58b emerging from evaporator 16 which is at a temperature of about 27° C. so that circulating water T58 at a temperature of about 17.9° C. is delivered from mixing tank 54 to condenser 32 by circulating water pump 60. Where it is required that the temperature of the discharged warm water T58a be about 29° C., as was described above for the thermal power station operated alone, the temperature rise in condenser 32 can be about 11.1° C. This is larger than the temperature rise of 7° C. in the condenser in the thermal power station operated alone and requires only about 37,700 t/h of circulating water T58 compared to 60,000 t/h for a thermal power station operated alone.

The circulating water T58a is used to heat the working fluid in the evaporator 16. In Case I, there is a temperature drop of 2° C. between water T58a entering the evaporator 16 and water T58b leaving it. The quantity of circulating water T58a required for evaporator 16 is about 19,200 t/h and this is the quantity of water T58b delivered to the mixing tank 54. The remainder 18,500 t/h of circulating water T58a is discharged as excess discharged water T62 through pipe 62.

In the above described thermal power station operated alone, the quantity 60,000 t/h of cooling water required is equal to the quantity of water discharged. In Case I, the quantity of the cooling water T52 is also equal to that of the excess discharged water T62 and is 18,500 t/h which is only about 30% of 60,000 t/h. Consequently, the output of ocean thermal energy conversion power plant 10 is 1,300 kW. The output of turbine 40 in steam generation power plant 30 is increased by about 1,000 kW since the temperature 17.9° C. of the circulating water T58 is lower than the temperature of the circulating water in thermal power station operated alone and causes the pressure in condenser 32 to be lower.

Since the temperature of the seawater at the ocean floor (or at a depth of about 500 to 600 meters) is constant throughout the year, the temperatures of circulating waters T58 and T58a also are constant. Therefore, it is not necessary that the components of the steam power generation plant have excess capacity and the ocean thermal energy conversion power plant can continue to be operated in winter at design capacity.

The quantity of circulating water required for condenser 32 is 37,700 t/h. Pump 50 provides 18,500 t/h and the other 19,200 t/h is circulating in circulating water pipe 58 through condenser 32 and evaporator 16. Circulating water T58 provides the heat exchange function between the heat energy in condenser 32 and in evaporator 16. Accordingly, the temperature of the circulating water T58 is adjustable through circulating water pipe 58 which connects condenser 32 with evaporator 16.

In Case II shown in the TABLE, excess cold water T64 is discharged through bypass pipe 64. The temperature of the discharge water T62a through discharge pipe 62 is set at 22° C. However, this temperature is adjustable. The quantity of cooling water T52 is 27,000 t/h. The discharge warm water T62 is diluted by the excess cold water T64. The power generated by the ocean thermal energy conversion power plant is about 2,000 kW. In Case II, the temperature 22° C. of the discharge water can be the same as the seawater at the ocean surface and the quantity of the discharged water can be less than half the quantity of discharge water in the case of the thermal power station operated alone.

If the condenser 32 is limited in that its construction and heat transfer tubes are restricted, the temperature of the warm water discharged from condenser 32 can be higher than 22° C. Accordingly, the output of ocean thermal energy conversion power plant 10 can be increased. The warm water T58a discharged from condenser 32 in steam generation power plant 30 is used as the heating water in evaporator 16 in ocean thermal energy conversion power plant 10 so that evaporator 16 does not rely upon seawater at the ocean surface. Thus, conditions, required for establishing the ocean thermal energy conversion power plant 10, i.e., the physical conditions required at the location where the plant is to be built, can be lessened.

In practice, the temperature difference between the warm water T58a discharged from condenser 32 and the cooling water T52 is equal to or greater than 20° C. Accordingly, the temperature of the heating water delivered to the evaporator 16 is equal to or greater than 27° C. throughout the year. The uniform cold temperature of cooling water T52 throughout the year allows maximum utilization of the power plant according to this invention.

Figure 2:
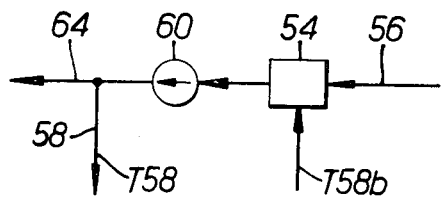
FIG. 2 is a partial schematic diagram of a second embodiment according to this invention.

FIG. 2 illustrates a modified form of the invention. Mixing tank 54 and circulating water pump 60 are connected by cold water pipe 56. Circulating water pump 60 is connected to bypass pipe 64. The circulating water T58 is supplied to condenser 32 by circulating water pump 60. The operation of the second embodiment is similar to the first embodiment shown in FIG. 1.

Figure 3:
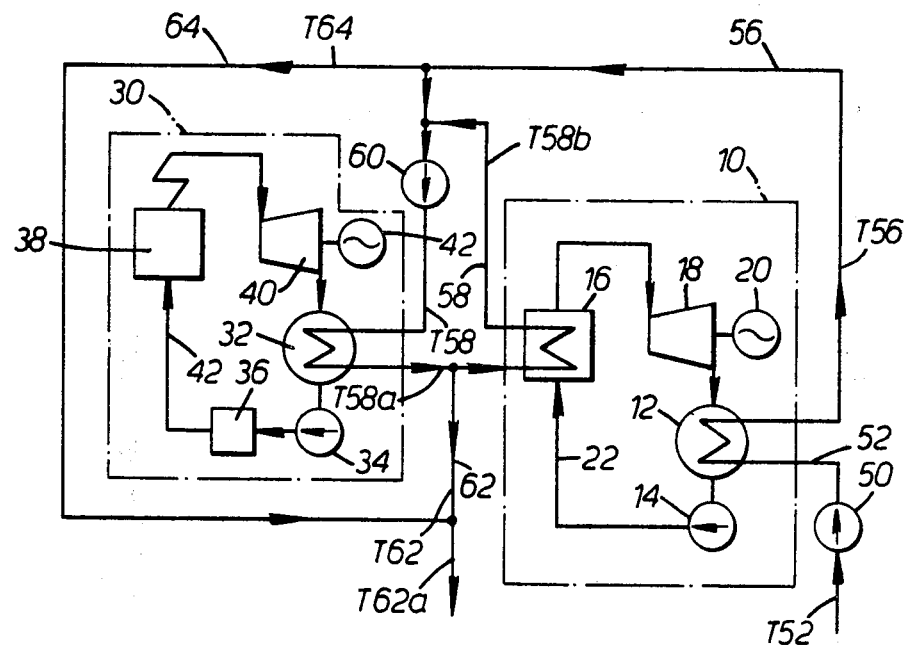
FIGS. 3 and 4 are schematic diagrams of third and fourth embodiments according to this invention.
Figure 4:
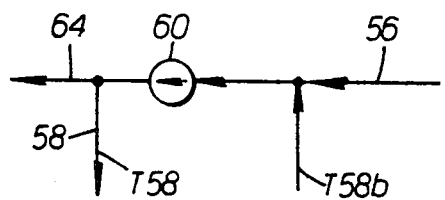

Moreover, mixing tank 54 may be avoided entirely such as is illustrated in FIGS. 3 and 4. In that case, a valve (not shown) would be provided at the juncture of pipes 56 and 64.

In the embodiment of FIG. 4, the mixing tank 54 is also avoided by connecting the circulating water pump between the cold water pipe 56 and the bypass pipe 64. The circulating water T58 is supplied to condenser 32 at a junction between lines 64 and 58.

In accordance with this invention, the quantity of cooling water T52 required is lower than required for a thermal power plant operated alone. Since the temperature of the warm water discharged also is lower than in an singular thermal power plant, the temperature of the water discharged can be substantially the same as that of the seawater and the environmental disruption can be avoided or minimized.

Furthermore, since the temperature of the cooling water is constant throughout the year, the plant is not required to have excess capacity and a lowered construction cost of about 6 to 10% can be attained.

Moreover the quantity of the circulating water T58 through condenser 32 is lower since the temperature difference between the circulating water T58 and the circulating water T58b is large. Therefore, the capacity of the circulating pump 60 in the present invention is about 80% of the circulating pump required in the thermal power station operated alone or less.

Since the temperature of the circulating water T58 is low compared to the thermal power plant operating alone and at an average seawater temperature of 22° C., the pressure in condenser 32 also is lower than in the singular thermal power plant. Accordingly, the output of steam turbine 40 in this invention is increased about 0.3 to 1% without increasing the size of the condenser 32.

What is claimed is:

1. A combination power plant comprising:
   an ocean thermal energy conversion power plant including a condenser and an evaporator;
   a steam power generation plant including a condenser;
   a cold water pipe for passing cooling water through the condenser in said ocean thermal energy conversion power plant;
   mixing means for receiving at least a part of said cooling water from said condenser through said cold water pipe; and
   a circulating water pipe for circulating water from said mixing means serially through the condenser in said steam power generation plant and then a portion of the water to the evaporator in said ocean thermal energy conversion power plant and back into said mixing means.

2. The combination power plant of claim 1 further comprising:
   a water discharge pipe connected to said circulating water pipe between the condenser in said steam power generation plant and the evaporator in said ocean thermal energy conversion power plant.

3. The combination power plant of claim 2 further comprising:
   a bypass pipe connected to said cooling water pipe and said water discharge pipe.

4. The combination power plant of claim 2 further comprising:
   a bypass pipe connected to said mixing means and said water discharge pipe.

* * * * *